United States Patent
Berge et al.

(10) Patent No.: US 9,615,248 B2
(45) Date of Patent: Apr. 4, 2017

(54) ANONYMOUS VEHICLE COMMUNICATION PROTOCOL IN VEHICLE-TO-VEHICLE NETWORKS

(71) Applicant: GLOBALFOUNDRIES INC., Grand Cayman (KY)

(72) Inventors: Layne A. Berge, Rochester, MN (US); John R. Dangler, Rochester, MN (US); Matthew S. Doyle, Rochester, MN (US); Thomas A. Haselhorst, Rochester, MN (US); Thomas W. Liang, Rochester, MN (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 45 days.

(21) Appl. No.: 14/674,859

(22) Filed: Mar. 31, 2015

(65) Prior Publication Data

US 2016/0295401 A1 Oct. 6, 2016

(51) Int. Cl.
*H04L 12/26* (2006.01)
*H04W 12/02* (2009.01)
(Continued)

(52) U.S. Cl.
CPC ........... *H04W 12/02* (2013.01); *H04L 9/3236* (2013.01); *H04L 41/28* (2013.01);
(Continued)

(58) Field of Classification Search
CPC .......... H04L 63/083; H04L 9/065; H04L 9/30
(Continued)

(56) References Cited

U.S. PATENT DOCUMENTS

| 8,526,606 B2 | 9/2013 | Muthaiah |
| 2006/0176847 A1* | 8/2006 | Chen ...................... G08G 1/161 370/328 |

(Continued)

FOREIGN PATENT DOCUMENTS

| CN | 102740286 A | 10/2012 |
| CN | 102752130 A | 10/2012 |
| WO | 2014171940 A1 | 10/2014 |

OTHER PUBLICATIONS

Anonymous, "Real-time collection and processing of vehicle system data in a Wireless Content Delivery Network", An IP.com Prior Art Database Technical Disclosure, Apr. 15, 2013. IP.com No. 000226548.

(Continued)

*Primary Examiner* — Haresh N Patel
(74) *Attorney, Agent, or Firm* — Thompson Hine LLP

(57) ABSTRACT

A system and method for managing device communication anonymously in wireless networks. A controller in a device manages communication for the device. The device has a static device tag. The controller establishes a first key for the device. The controller establishes the first key in response to a first triggering event of the device. The first key is based on a first status of the device. The controller generates a first identifier of the device. The controller generates the first identifier by using a hashing technique. The controller uses the hashing technique on a combination of the first key and the static device tag. The first identifier is for identifying the device on a first wireless network. The controller provides a second status of the device. The controller provides the second status to the first wireless network. The controller couples the second status with the first identifier.

20 Claims, 3 Drawing Sheets

(51) Int. Cl.
| | |
|---|---|
| *H04W 64/00* | (2009.01) |
| *H04W 12/04* | (2009.01) |
| *H04W 12/06* | (2009.01) |
| *H04L 9/32* | (2006.01) |
| *H04L 12/24* | (2006.01) |
| *H04L 29/06* | (2006.01) |
| *H04W 4/04* | (2009.01) |

(52) U.S. Cl.
CPC ......... *H04L 63/0407* (2013.01); *H04W 12/04* (2013.01); *H04W 12/06* (2013.01); *H04W 64/006* (2013.01); *H04W 4/046* (2013.01)

(58) Field of Classification Search
USPC .......................... 713/168, 156, 172; 726/5, 7
See application file for complete search history.

(56) References Cited

U.S. PATENT DOCUMENTS

| | | | | |
|---|---|---|---|---|
| 2009/0072995 | A1* | 3/2009 | Thomas | G08G 1/096791 340/902 |
| 2009/0079591 | A1* | 3/2009 | Motoyama | G08G 1/205 340/991 |
| 2009/0150118 | A1* | 6/2009 | Naima | G01C 22/02 702/165 |
| 2011/0106591 | A1* | 5/2011 | Eckhoff | B60K 6/44 705/14.1 |
| 2013/0212659 | A1 | 8/2013 | Maher et al. | |
| 2014/0324247 | A1* | 10/2014 | Jun | G07C 5/0866 701/1 |
| 2014/0324312 | A1 | 10/2014 | Okuya et al. | |
| 2015/0033016 | A1* | 1/2015 | Thornton | H04L 9/0825 713/171 |
| 2015/0079932 | A1* | 3/2015 | Zelinka | H04W 12/02 455/411 |
| 2016/0035148 | A1* | 2/2016 | Huang | G07C 5/008 701/31.4 |
| 2016/0195602 | A1* | 7/2016 | Meadow | G01S 5/0027 701/517 |

OTHER PUBLICATIONS

Burmester et al., "Secure and Privacy-Preserving, Timed Vehicular Communication", International Journal of Ad Hoc and Ubiquitous Computing. vol. 10, Issue 4. Sep. 2012. Inderscience Publishers, Geneva, Switzerland. DOI: 10.1504/IJAHUC.2012.049068.

Hubaux et al., "The Security and Privacy of Smart Vehicles", IEEE Security & Privacy vol. 2, No. 3, pp. 49-55, May-Jun. 2004. DOI: 10.1109/MSP.2004.26.

Rabadi et al., "Drivers' Anonymity with a Short Message Length for Vehicle-to-Vehicle Communications Network", 5th IEEE, Consumer Communications and Networking Conference, 2008. pp. 132-133. Jan. 10-12, 2008. DOI: 10.1109/CCNC08.2007.36.

\* cited by examiner

US 9,615,248 B2

ANONYMOUS VEHICLE COMMUNICATION PROTOCOL IN VEHICLE-TO-VEHICLE NETWORKS

BACKGROUND

The present disclosure relates to computer systems, and more specifically, to managing device communication in an anonymous manner in wireless networks.

In modern wireless networks, devices often must transmit data related to itself to the network to derive the full benefit of that network. For example, a vehicle to vehicle network may require automobiles/trains/bikes using the network to identify themselves and provide location, speed, and destination data to manage traffic and optimize travel. Alternatively, an airport offering network connectivity may require a cell phone/laptop/tablet to identify itself and provide browser data before it would provide network access, so the airport can control/monitor what websites are visited.

SUMMARY

Aspects of the disclosure include managing device communication anonymously in wireless networks. A controller in a device manages communication for the device. The device may have a static device tag. The controller establishes a first key for the device. The controller establishes the first key in response to a first triggering event of the device. The first key may be based on a first status of the device. The controller generates a first identifier of the device. The controller may generate the first identifier by using a hashing technique. The controller uses the hashing technique on a combination of the first key and the static device tag. The first identifier may be for identifying the device on a first wireless network. The controller provides a second status of the device. The controller provides the second status to the first wireless network. The controller may couple/conjoin the second status with the first identifier.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
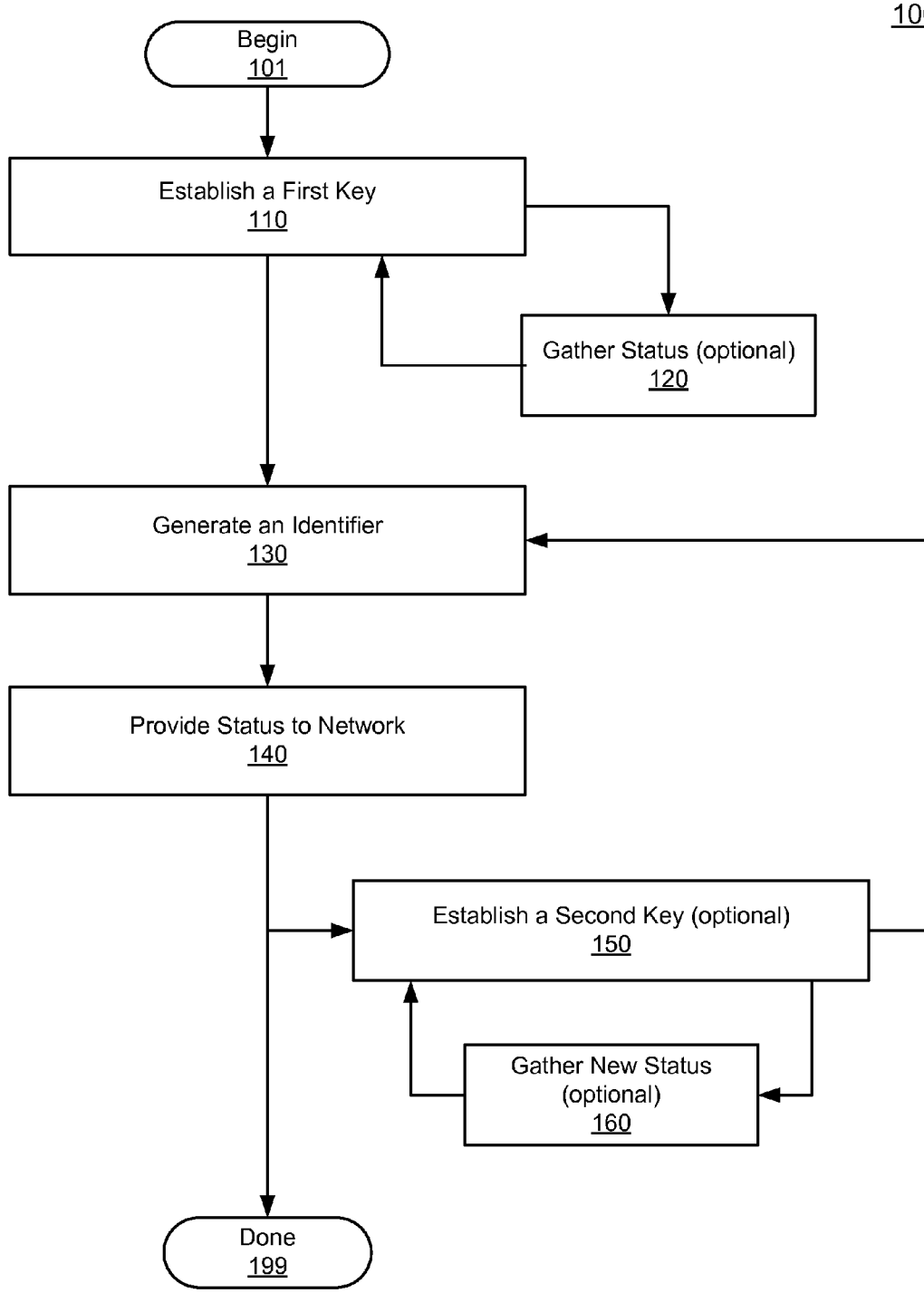
FIG. 1 depicts one embodiment of an illustrative method for managing device communication anonymously in wireless networks.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Devices such as vehicles may access public networks such as vehicle-to-vehicle (V2V) communication networks. V2V networks may allow for driverless vehicle systems and "smart" traffic systems. To connect to these networks, the networks may require the devices to provide identifying information so the network can track the device while the device is connected to the network. For example, a moving vehicle may send location and speed data which is tagged with a vehicle identifier (VID) to a V2V network. Using this data, the V2V network may track the movements of the vehicle.

For example, in some conventional systems, devices may use license plates, vehicle identification numbers (VINs), or a static or otherwise predictable VID to provide information to a V2V network. In such instances, a third party with access to data on the V2V network may record the data associated with static or otherwise predictable VIDs. With this data, a third party may make associations between an identifier and the specific vehicle, or associations between an identifier and the owner of a vehicle. With this association, the third party can potentially determine the driving activities, destinations, and routes traveled of the vehicle/owner. In other conventional systems, a vehicle may hash a static or otherwise predictable VID one time, and then use this hashed value as a long-term identifier for a plurality of trips of the vehicle. While such a long-term identifier can decrease the likelihood of a third party discovering the actual vehicle/owner, a third party may nonetheless record the activities and behaviors of the long-term identifier. With this information, the third party may recognize when a known long-term identifier utilizes the network and—despite not knowing the true identity of the vehicle/owner associated with the long-term identifier—have the ability to accurately predict where the vehicle/owner behind the long-term identifier will travel based on past behavior. Aspects of the disclosure may provide privacy benefits by regularly generating new and unpredictable VIDs, deterring such associating and predicting by third parties.

Aspects of the disclosure relate to managing device communication anonymously in wireless networks. A device may use wireless computing networks to connect to resources and devices. Wireless networks sometimes require information from the device. This information may include a source of identification for the device. To use the network without broadcasting authentic identification, the embodiments as described herein use a controller on the device to create a new and distinct identifier to distinguish the device. The controller may create these new and distinct identifiers at regular intervals to impede both identification of the device/owner and prediction of the device/owner based on past behavior over the networks. In some embodiments, the controller creates new identifiers by hashing a random datum summed with an actual unique characteristic of the device. The device may then provide the device information along with the new identifier to the network. Put differently, embodiments of the disclosure may create and employ device identifiers which are unique within the network, are changed at regular intervals to impede tracking of the device, and are distinct from values which can be used to ascertain the identity of the device or device owner outside of the network.

In V2V embodiments, the device may generate VIDs using cryptographic hashes on a unique tag of a vehicle summed with time data. A controller in the device may get the time data from the time module (e.g., a module within the control system or a component of the vehicle's on-board computer system such as the engine control unit). The controller may pull time data from the time module during a startup sequence (e.g., the time at which the engine of the vehicle was started). The controller may combine this time data with the unique tag (e.g., a VIN of the vehicle). The controller may then hash this combination using a cryptographic hashing algorithm to create the VID for the vehicle for that trip. Employing a hashing technique on two elements (the tag and the time data) may result in a VID which is unique enough to reduce the likelihood that a separate device would utilize the same VID. The controller may repeat this process every time the vehicle starts, therein regularly creating new VIDs which may result in security benefits for the users of the vehicles. Such a system and method may provide anonymity for vehicles and drivers while still allowing a unique VID for in-transit V2V communication for traffic assessment, route planning, and general V2V communication.

Aspects of the disclosure include managing device communication anonymously in wireless networks. A controller in a device may manage communication for the device. The device may have a static device tag. The controller may establish a first key for the device. The controller may establish the first key in response to a first triggering event of the device. The first key may be based on a first status of the device. The controller may generate a first identifier of the device. The controller may generate the first identifier by using a hashing technique. The controller may use the hashing technique on a combination of the first key and the static device tag. The first identifier may be for identifying the device on a first wireless network. The controller may provide a second status of the device. The controller may provide the second status to the first wireless network. The controller may couple/conjoin the second status with the first identifier.

In embodiments, the controller may establish a second key for the device. The controller may establish the second key in response to a second triggering event. The second key may be different than the first key. In certain embodiments, the second key may be based on a status of the device. The controller may generate a second identifier of the device. The controller may generate the second identifier by using the hashing technique. The controller may use the hashing technique on a combination of the second key and the static device tag. The second identifier may be for identifying the device on a second wireless network. The controller may provide a third status of the device to the second wireless network. The controller may couple the third status with the second identifier.

In certain embodiments, the device may be a vehicle. In such embodiments, the static device tag may be a vehicle identification number (VIN) of the vehicle. The first triggering event may be the vehicle turning on at a first time. The first status may include the first time. The first key may be time data of the first time. The second status may include global positioning system (GPS) data of the vehicle. The second status may include velocity data of the vehicle.

FIG. 1 is a flowchart illustrating one embodiment of an exemplary method 100 for managing device communication anonymously in wireless networks. Method 100 may be implemented by a controller on a device. The device may be a vehicle, cell phone, laptop, tablet, or any other mobile device which has wireless capabilities allowing the device to connect and send data to public networks. For example, the device may be a car and the public network may be a V2V network, or the device may be a cell phone and the public network may be an airport wireless local area network (WLAN). Aspects of method 100 begin at block 101.

At block 110 a first key is established. A controller within the device may establish the first key. In embodiments, the first key may be a datum of a characteristic of the device which changes over time measured over a specific period of time for use as a cryptographic salt. In certain embodiments, the specific period of time may be instantaneous. The cryptographic salt may be such as is known in the art. The first key may be used in method 100 to make an identifier for the device. By making an identifier with a key which is pulled from a changing characteristic of the device, the identifier may be difficult to predict by a third party attempting to track the device on the network over a plurality of trips. In embodiments, a trip may be an event relating to a device which starts when the device begins utilizing a network which requires identifying information of the device and concludes when the device stops using said network. For example, a trip for a vehicle in a V2V network could be a single drive by the vehicle through the V2V network.

For example, the first key may be based off of the characteristic "average speed" (e.g., miles per hour or kilometers per hour) over a time period "five minutes prior to detecting V2V network." In this example, a car may have been started at 11:45 in a rural area which was without a V2V network. Further, the car may have been driven towards a city at a speed which fluctuated between 65 and 70 mph for ten minutes before a controller in the car detected a V2V network at 11:55. In response to detecting this V2V network, the controller may have pulled speed data from a speedometer or other speed module and found an average (e.g., statistical mean) speed of "67.8" from 11:50 until 11:55. For another example involving a car in a V2V network, the first key may be based off of the characteristic "time of a day" over a time period which is stored as "millisecond that car is started." In this example, a car started at 7:43:12 AM may have a first key of "074312" or may have a first key which includes the number of milliseconds from 00:00:00 of that day to the starting time. Alternatively, the first key may be based off of the characteristic "GPS coordinates" over a time period "moment the device is turned on." In this instant the GPS coordinates may be "34 59 20 06 36 52" which the controller can use as a key. Other types of characteristics can be used for first keys in other embodiments.

The controller establishes the first key in response to a first triggering event. In embodiments, the first triggering event may be a regularly occurring circumstance or action which relates to a device in response to which the controller establishes the first key. In such embodiments, such regular occurrence may mean multiple times a day, once a day, or once every few days. For an example of a triggering event, if the device is a train, the event could be the train being started or the train coming into range of other vehicles in a V2V network. For another example, for a device which is a computing tablet, a triggering event could be the tablet being connected to a coffee shop WLAN or the tablet staying connected to the coffee shop WLAN for a set time period (e.g., 60 minutes). In certain embodiments, a user of the device could select the triggering event which will be used in method 100. In such embodiments a user of a cell phone selects between the triggering events of "encountered new network," "detected it has been a week since previous triggering event," or "cell phone turned on," for example. In other embodiments, the device may come with a pre-set triggering event. Other examples of triggering events are possible.

The controller establishes the first key based on a status (e.g., a first status) of the device. In some embodiments, the first status may be a set of data relating to one or more characteristics of a device over a specific period of time. The set of data may relate to some characteristics of the device by including measurements of those characteristics. The characteristics and actions of the device may relate to the condition or position of the device relative to the surroundings of the device. For example, a characteristic could be a speed of the device or the distance of the device from a specific object, and an action of the device could be the device starting or accessing information over the network. The period of time may be sufficiently short (e.g., a millisecond, a second, or a few minutes) and/or the set of data may be sufficiently precise (e.g., a location specified down to an inch, a time specified down to a millisecond, or a speed calculated to two decimal points, etc.) to increase the likelihood that the status is unique or distinct. Increasing the likelihood that the status is unique or distinct may therein increase the likelihood that an identifier created by the controller using the status will be unique or distinct.

Many different embodiments of a first status are possible. For example, if the device is a truck, a first status could include time data at a first time (e.g., the time of the day when the first status occurred), speed data (e.g., the speed of the truck at the aforementioned time of the day), or location data at a first location (e.g., the GPS coordinates of the truck at the aforementioned time). Other examples of the first status are also possible.

In embodiments, the controller may optionally gather the first status at block 120. In certain embodiments, the controller will alternatively be provided/receive the first status. The controller may gather the first status by querying a database, querying one or more sensors, or querying one or more modules. For example, if the first status includes time data, at block 120 the controller may gather the time data from a time module of the device in response to the first triggering event. Alternatively, if the first status includes speed data, the controller may gather the speed data from a speedometer module of the device in response to the first triggering event.

At block 130 the controller generates a first identifier. In embodiments, a first identifier may be a series of alphanumeric characters and symbols which are unique to the device and can be used to distinguish the device among other devices on the network. For example, a first identifier may be a set of fifty alphanumeric characters which the controller uses to identify the device on a first wireless network.

The device may have a static device tag. In some such embodiments, the static device tag may be an identifying characteristic that is unique to that device relative to other devices on the network which typically does not change between triggering events. The identifying characteristic may be a serial number or the like which can be used in contexts other than the network to identify the device. By using a unique characteristic for a device tag, the device may have a tag which is exclusive to that device on the network. For example, if the device is a vehicle, the static device tag may be a vehicle identification number (VIN) or a license plate of the vehicle. Alternatively, if the device is a laptop, the static device tag may be a serial number of the laptop. In certain embodiments, the static device tag may be a unique value which was imbedded into the control system of the device upon device manufacture. In such embodiments, the static device tag may be stored in a hashed format, the original static device tag of the device being hashed by a hashing algorithm during manufacture. Other examples of static device tags are also possible.

The controller may generate the first identifier by combining the first key and the static device tag and hashing the combination. The controller may employ many different varieties of secure cryptographic hashing techniques (e.g., MD5 or SHA-3) to hash the combination. In embodiments, the controller may combine the first key and static device tag by summing the two together. For example, if the first key is a time of day 160503 (i.e., 04:05:03 PM) and the static device tag is a license plate AAA000, the controller may change all letters to numbers (e.g., A=1, B=2, etc.) and add the two together to get a combination of 271503 (i.e., 160503+111000=271503). The controller may then hash this combination as described above. In other embodiments, the controller may combine the first key and static device tag by concatenating the two together. For example, if the first key is a velocity 72.41 mph and the first key is a VIN JH4TB2H26CC000000, the controller may concatenate the two together to get a combination of JH4TB2H26CC00000072.41. This combination may then be hashed to create the first identifier.

At block 140 the controller provides a second status to the network. In embodiments, the second status may be a second set of data relating to the characteristics of a device over a specific period of time, akin to the first status as defined herein. The second status may include similar types of data as the first status. While in some embodiments the first status is for establishing a unique characteristic of the device for creating the first identifier, the second status may be for ascertaining the state of the device to coordinate with other devices on the network or managing the resources of the network. For example, if the device is a motorcycle in a V2V network, the second status can include GPS data, velocity data, or destination data for the controller to transmit to other vehicles in the network to avoid collisions and optimize traffic. For another example, if the device is a cellular device, the second status may include download information, GPS information, or browser information.

In embodiments, the network may be any computing network which requires a device to provide identifying information of the device at least once if the device is connected to the network. In embodiments, the network may need the identifying information to ensure that devices on the network can distinguish between devices while coordinating efforts. In other embodiments, the network may need the identifying information so that network resources can be allocated or controlled. For example, the network may be a V2V network requiring vehicle information (e.g., speed and location of the vehicle), an airport WLAN network requiring device download information (e.g. kilobytes downloaded by the device), or a library local area network (LAN) requiring device browser information (e.g., webpages opened by a student laptop).

The controller may provide the second status to the network in such a way that the second status is coupled with first identifier. For example, the controller may send a message to the network with a header of the first identifier and a body which includes data from the second status. In this way the controller can utilize the network by sending and receiving data while providing the first identifier rather than the static device tag. Put differently, the controller may send and receive data to the network with a dynamic identifier for the device which changes regularly rather than providing static credentials which do not change.

In some embodiments, a second key is optionally established by the controller at block 150, using a new status. The second key may be established using techniques similar to those described above with respect to block 110. For example, the second key may be a datum which reflects a characteristic of the device over a period of time for use as a cryptographic salt. The controller may establish the second key in response to a second triggering event. For example, if the device is a car, the second triggering event may be the car being turned on a second time.

The second key may be different than the first key. In embodiments, the second key may be different because the controller gathers a new status of the device at block 160. The new status may be gathered as described in block 120 where the first status was gathered. The new status may contain data on the characteristics and actions of the device as described herein. For example, the new status may be the time at which the device was activated in the second triggering event.

Following the establishment of the second key, the controller may generate a second identifier at block 130 using techniques similar to those described above for generating the first identifier. The controller may use a hashing technique as described herein on a combination of the second key and the static device tag. In embodiments, as the static device tag can be an identifying characteristic which typically does not change between triggering events, the static device tag may be the same static device tag used in the combination in response to the first triggering event. For example, if the device is a car and the static device tag is a VIN of the car, the static device tag would not have changed from the first triggering event to the second triggering event. However, in certain embodiments, the static device tag may be an identifying characteristic which has changed since the previous triggering event. For example, if the device is a car and the static device tag is a license plate combination (e.g., the characters on a license plate), the car may have received new license plates since the previous triggering event. In this instance, the controller would utilize the new license plate combination as the static device tag for the second identifier. The controller may likewise use the new license plate combination for future identifiers in response to future triggering events until the license plate changes again.

The controller may then provide the status of the device to a second wireless network in block 140 as described herein. In embodiments, the second wireless network may be the same network as the first wireless network. For example, if the device is a taxi which only operates in one city with a singular V2V network, the taxi may always provide data to the same wireless network (e.g., the singular V2V network of the city). The status provided to the network in response to the second triggering event may be sent in a message coupled with the second identifier as described herein.

Figure 2:
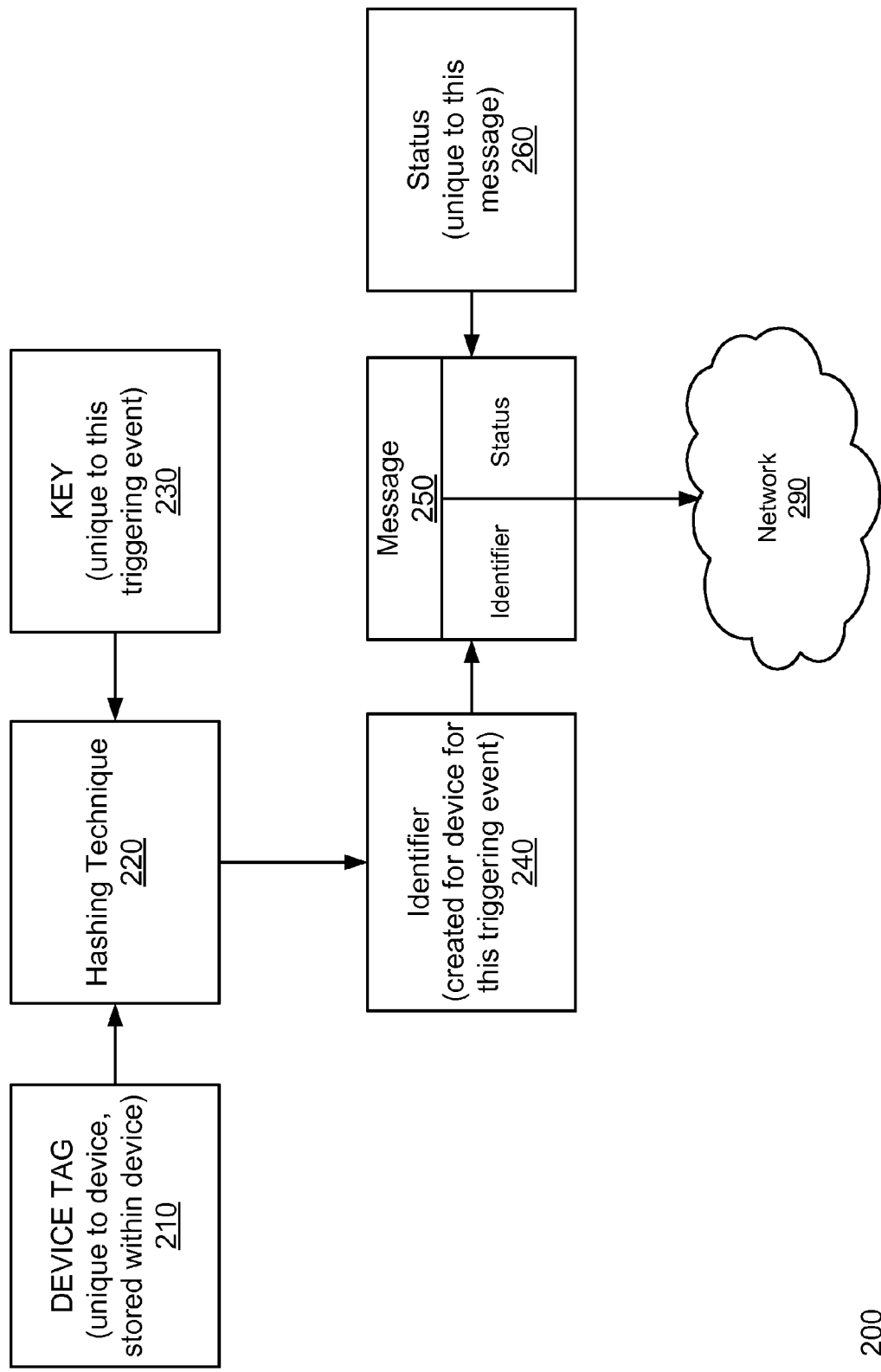
FIG. 2 depicts one embodiment of an illustrative flow of data for a controller managing device communication anonymously in wireless networks.

FIG. 2 depicts the flow of data 200 that a controller within a device may manage while providing the device with anonymous communication in wireless networks according to embodiments. For example, the device may be a semi-trailer truck and wireless networks may be V2V networks that the semi-trailer truck utilizes. FIG. 2 may begin with a triggering event as described herein. For example, the triggering event may be the semi-trailer truck being turned on in a city with a V2V network. In response to the triggering event, the controller may create a key 230 which is unique to this triggering event. In this example a controller within the semi-trailer truck may create a key 230 based on the time at which the semi-trailer truck was turned on for the triggering event. For example, the semi-trailer truck may have been started at 5:30:12 AM, so the controller may create a key 230 of "053012."

The semi-trailer truck has a device tag 210 which is unique to the device. For example, the semi-trailer truck controller may have a static device tag 210 of a VIN which is stored in the on-board computer system of the semi-trailer truck. The VIN of this truck may be "1FTDF10FXCN427362." The controller may combine the key 230 and the device tag 210. In this example, the controller concatenates the key 230 and device tag 210 to arrive at "0530121FTDF10FXCN427362." However, it is to be understood that they can be combined differently in other embodiments. The controller may hash this combination using a hashing technique 220 as described herein. For example, the controller may hash the combination "0530121FTDF10FXCN427362" with an MD5 hashing technique to arrive at an output "b9558456ab1322dcbf9a4f1303eb088a". However, it is to be understood that other hashing techniques can be utilized in other embodiments This output from the hashing technique 220 can now be used an identifier 240 for the device. The controller may couple a status 260 of the device with the identifier 240 of the device to create a message 250. For example, the controller within a semi-trailer truck may concatenate a set of data detailing a speed (e.g., 72.15 mph, current location (e.g., longitude −92.505569 and latitude 44.061285), and intended destination (e.g., longitude of −93.084979 and latitude of 44.950069) into a status 260 (e.g., 72.15///92.505569,44.061285///−93.084979,44.950069). This status 260 may be coupled to the identifier 240 of the semi-trailer truck into a message 250. The identifier 240 may be necessary so the network could distinguish the incoming message 250 as relating to the semi-trailer truck. The controller may then provide this message 250 to the network 290. The controller may send regular messages to the network as the status of the semi-trailer truck changes, providing new locations, speeds, or intended destinations.

In embodiments the controller may generate each identifier for a single triggering event and use said identifier until the device is turned off or a new triggering event is detected. In such embodiments, after the new triggering event, the controller may delete the original identifier, overwrite the original identifier with a new identifier, or create the new identifier and leave the original identifier in storage.

In embodiments this flow of data could be repeated for the same device numerous times. For example, as the semi-trailer truck exits the city it may reach the edge of the V2V network. In response to leaving the boundaries of this network the controller may delete the identifier. The semi-trailer truck may then enter a new city with a new V2V network. Despite the fact that the semi-trailer truck was never turned off, the detection of the new V2V network may qualify as a new triggering event. In response to this new triggering event, the controller may establish a new key 230 and generate a new identifier 240. In this way the controller could comply with the needs of the wireless network while providing privacy benefits to the device.

Figure 3:
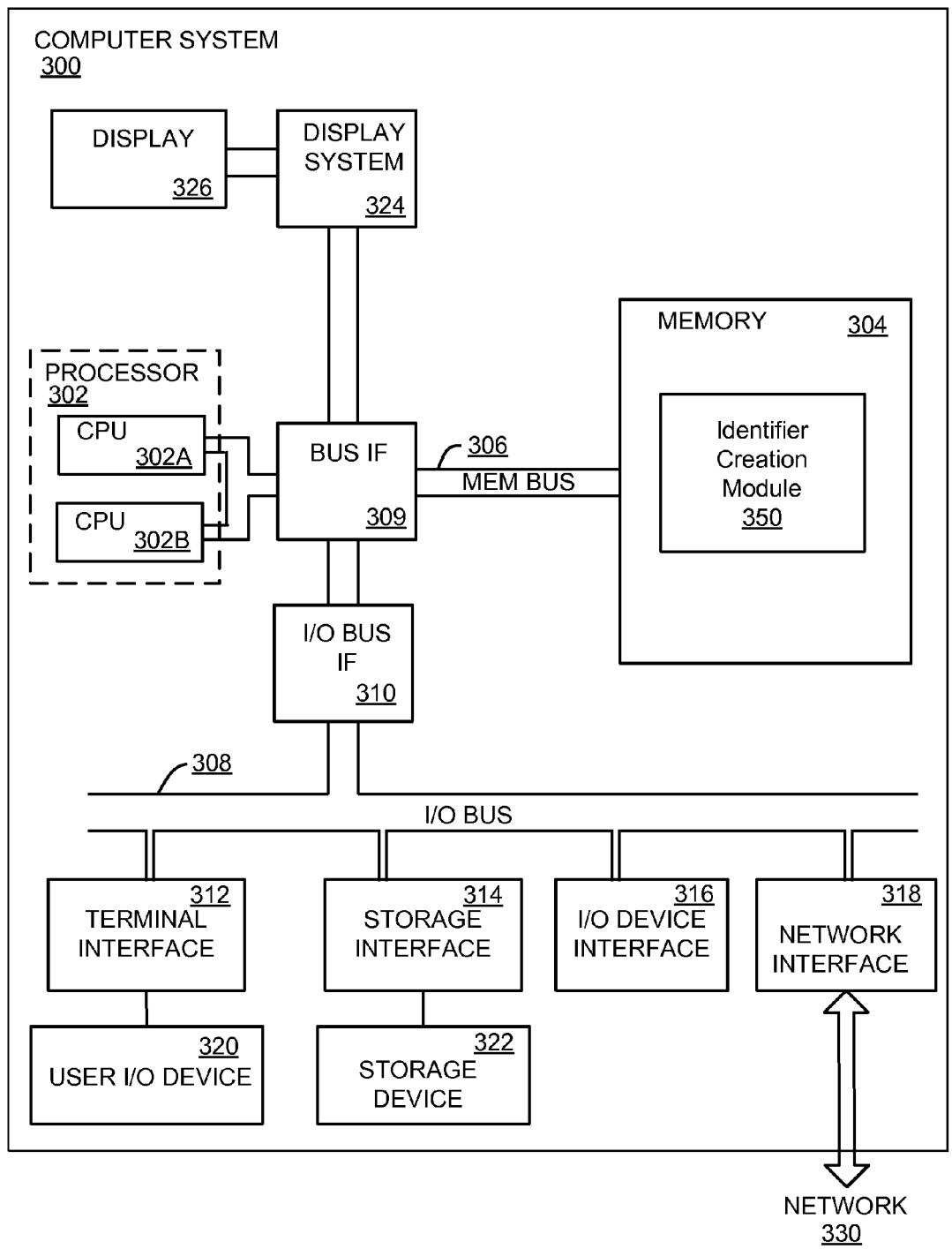
FIG. 3 depicts one embodiment of an illustrative system for managing device communication anonymously in wireless networks.

FIG. 3 depicts a high-level block diagram of a computer system 300 for implementing various embodiments. The mechanisms and apparatus of the various embodiments disclosed herein apply equally to any appropriate computing system. The components of the computer system 300 shown in FIG. 3 include one or more processors 302, a memory 304, a terminal interface 312, a storage interface 314, an I/O (Input/Output) device interface 316, and a network interface 318, all of which are communicatively coupled, directly or indirectly, for inter-component communication via a memory bus 306, an I/O bus 308, bus interface unit 309, and an I/O bus interface unit 310.

The computer system 300 may contain one or more general-purpose programmable central processing units (CPUs) 302A and 302B, herein generically referred to as the processor 302. In embodiments, the computer system 300 may contain multiple processors, multi-core processors, or, in certain embodiments, a single CPU system. Each processor 302 executes instructions stored in the memory 304 and may include one or more levels of on-board cache.

In embodiments, the memory 304 may include a random-access semiconductor memory, storage device, or storage medium (either volatile or non-volatile) for storing or encoding data and programs. In certain embodiments, the memory 304 represents the entire virtual memory of the computer system 300, and may also include the virtual memory of other computer systems coupled to the computer system 300 or connected via a network. The memory 304 can be conceptually viewed as a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 304 may store all or a portion of the various programs, modules and data structures for processing data transfers as discussed herein. For instance, the memory 304 can store a controller module 350, herein described as an identifier creation module 350. In embodiments, the identifier creation module 350 may include all or part of the instructions or statements executed by the processor(s) to implement embodiments of method 100 as further described herein. In certain embodiments, all or part of the identifier creation module 350 is implemented in hardware via semiconductor devices, chips, logical gates, circuits, circuit cards, and/or other physical hardware devices in lieu of, or in addition to, a processor-based system. In embodiments, the identifier creation module 350 may include data in addition to instructions or statements.

The computer system 300 may include a bus interface unit 309 to handle communications among the processor 302, the memory 304, a display system 324, and the I/O bus interface unit 310. The I/O bus interface unit 310 may be coupled with the I/O bus 308 for transferring data to and from the various I/O units. The I/O bus interface unit 310 communicates with multiple I/O interface units 312, 314, 316, and 318, which are also known as I/O processors (IOPs) or I/O adapters (IOAs), through the I/O bus 308. The optional display system 324 may include a display controller, a display memory, or both. The display controller may provide video, audio, or both types of data to a display device 326. The display memory may be a dedicated memory for buffering video data. The display system 324 may be coupled with a display device 326, such as a standalone display screen, computer monitor, television, or a tablet or handheld device display. In one embodiment, the display device 326 may include one or more speakers for rendering audio. Alternatively, one or more speakers for rendering audio may be coupled with an I/O interface unit. In alternate embodiments, one or more of the functions provided by the display system 324 may be on board an integrated circuit that also includes the processor 302. In addition, one or more of the functions provided by the bus interface unit 309 may be on board an integrated circuit that also includes the processor 302. Certain embodiments may not include a display 326 or display system 324.

The optional I/O interface units support communication with a variety of storage and I/O devices. For example, the terminal interface unit 312 supports the attachment of one or more user I/O devices 320, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 320 and the computer system 300, and may receive output data via the user output devices. For example, a user interface may be presented via the user I/O device 320, such as displayed on a display device, played via a speaker, or printed via a printer. Certain embodiments may not support user I/O device 326 attachment.

The optional storage interface 314 supports the attachment of optional storage devices 322. In some embodiments, the storage device 322 may be implemented via any type of secondary storage device. The contents of the memory 304, or any portion thereof, may be stored to and retrieved from the storage device 322 as needed. The I/O device interface 316 provides an interface to any of various other I/O devices or devices of other types, such as printers or fax machines. Certain embodiments may not support storage interface 314 or storage device 322 utilization. The network interface 318 provides one or more communication paths from the computer system 300 to other digital devices and computer systems; these communication paths may include, e.g., one or more networks 330. In embodiments, these networks 330 may be the same networks 290 shown in FIG. 2 and discussed in FIG. 1.

Although the computer system 300 shown in FIG. 3 illustrates a particular bus structure providing a direct communication path among the processors 302, the memory 304, the bus interface 309, the display system 324, and the I/O bus interface unit 310, in alternative embodiments the computer system 300 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 310 and the I/O bus 308 are shown as single respective units, the computer system 300 may, in fact, contain multiple I/O bus interface units 310 and/or multiple I/O buses 308. While multiple I/O interface units are shown, which separate the I/O bus 308 from various communications paths running to the various I/O devices, in other embodiments, some or all of the I/O devices are connected directly to one or more system I/O buses.

In various embodiments, the computer system 300 is a multi-user mainframe computer system, a single-user system, or a server computer or similar device that has little or no direct user interface, but receives requests from other computer systems (clients). In other embodiments, the computer system 300 may be implemented as a desktop computer, portable computer, laptop or notebook computer, tablet computer, pocket computer, telephone, smart phone, or any other suitable type of electronic device.

FIG. 3 depicts several high-level components of the computer system 300. Individual components, however, may have greater complexity than represented in FIG. 3, components other than or in addition to those shown in FIG. 3 may be present, and the number, type, and configuration of such components may vary. Several particular examples of additional complexity or additional variations are disclosed herein; these are by way of example only and are not necessarily the only such variations. The various program components illustrated in FIG. 3 may be implemented, in various embodiments, in a number of different manners, including using various computer applications, routines, components, programs, objects, modules, data structures, etc., which may be referred to herein as "software," "computer programs," or simply "programs."

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing vehicle communication anonymously in wireless vehicle-to-vehicle (V2V) networks, comprising:
   identifying a first triggering event of a vehicle with a static device tag;
   establishing, in response to the first triggering event of the vehicle with the static device tag, a first key for the device, wherein the first key is based on a first status of the vehicle and the first status of the vehicle relates to a characteristic of the vehicle over a period of time;
   generating, by using a hashing technique on a combination of the first key and the static device tag, a first anonymous identifier of the vehicle for anonymously identifying the vehicle on a first wireless V2V network; and
   providing, to the first wireless V2V network, a second status of the vehicle together with the first identifier, wherein the second status of the vehicle relates to the state of the vehicle to anonymously coordinate with other vehicles on the first wireless V2V network.

2. The method of claim 1, further comprising:
   establishing, in response to a second triggering event of the vehicle, a second key for the vehicle, wherein the second key is different than the first key;
   generating, by using the hashing technique on a combination of the second key and the static device tag, a second anonymous identifier of the vehicle for anonymously identifying the device on a second wireless V2V network; and
   providing, to the second wireless V2V network, a third status of the vehicle together with the second identifier, wherein the third status of the vehicle relates to the state of the vehicle to anonymously coordinate with other vehicles on the second wireless V2V network.

3. The method of claim 2, wherein the second key is based on a fourth status of the vehicle.

4. The method of claim 1, wherein:
   the first triggering event of the device is the vehicle turning on at a first time;
   the first status includes the first time;
   the first key includes time data of the first time; and
   the second status includes global positioning system data of the vehicle and velocity data of the vehicle.

5. The method of claim 4, wherein the static device tag for the vehicle is a vehicle identification number for the vehicle.

6. The method of claim 1, wherein:
   the first triggering event is the vehicle entering a predefined range of a second V2V device; and
   the static device tag is a vehicle license plate number.

7. The method of claim 1, wherein the static device tag is exclusive to the vehicle.

8. A system for managing vehicle communication anonymously on wireless vehicle-to-vehicle (V2V) networks, the system comprising:
   a wireless V2V network interface;
   a memory; and
   one or more processing circuits communicatively coupled to the memory, wherein the one or more processing circuits are configured to:
      establish, in response to a first triggering event of a vehicle with a static device tag and a first key for the vehicle, wherein the first key is based on a first status of the vehicle and the first status of the vehicle relates to a characteristic of the vehicle over a period of time;
      generate, by using a hashing technique on a combination of the first key and the static device tag, a first anonymous identifier of the vehicle for anonymously identifying the vehicle on a first wireless V2V network; and
      provide, to the first wireless V2V network, a second status of the vehicle together with the first anonymous identifier, wherein the second status of the vehicle relates to the state of the vehicle to anonymously coordinate with other vehicles on the first wireless V2V network.

9. The system of claim 8, wherein the one or more processing circuits are further configured to:
   establish, in response to a second triggering event of the vehicle, a second key for the vehicle, wherein the second key is based on a fourth status of the vehicle, wherein the second key is different than the first key;
   generate, by using the hashing technique on a combination of the second key and the static device tag, a second anonymous identifier of the device for anonymously identifying the device on a second V2V wireless network; and
   provide, to the second wireless V2V network, a third status of the vehicle together with the second anonymous identifier, wherein the third status of the vehicle relates to the state of the vehicle to anonymously coordinate with other vehicles on the second wireless V2V network.

10. The system of claim 8, wherein:
the first triggering event of the vehicle is the vehicle turning on at a first time;
the first status includes the first time;
the first key includes time data of the first time; and
the second status includes global positioning system data of the vehicle and velocity data of the vehicle.

11. The system of claim 10, wherein the static device tag for the vehicle is a vehicle identification number for the vehicle.

12. The system of claim 8, wherein:
the first triggering event is the vehicle entering a predefined range of a second V2V device; and
the static device tag is a vehicle license plate number.

13. The system of claim 8, wherein the static device tag is exclusive to the vehicle.

14. A computer program product for managing vehicle communication anonymously on wireless vehicle-to-vehicle (V2V) networks, the computer program product disposed upon a non-transitory storage medium, the computer program product comprising computer program instructions that, when executed by a computer processor of a computer, cause the computer to:
establish, in response to a first triggering event of a vehicle with a static device tag and a first key for the vehicle, wherein the first key is based on a first status of the vehicle and the first status of the vehicle relates to a characteristic of the vehicle over a period of time;
generate, by using a hashing technique on a combination of the first key and the static device tag, a first anonymous identifier of the vehicle for anonymously identifying the vehicle on a first wireless V2V network; and
provide, to the first wireless V2V network, a second status of the vehicle together with the first anonymous identifier, wherein the second status of the vehicle relates to the state of the vehicle to anonymously coordinate with other vehicles on the first wireless V2V network.

15. The computer program product of claim 14, the computer program product further comprising instructions which, when executed by the computer processor, cause the computer to:
establish, in response to a second triggering event of the device, a second key for the vehicle, wherein the second key is different than the first key;
generate, by using the hashing technique on a combination of the second key and the static device tag, a second anonymous identifier of the vehicle for anonymously identifying the vehicle on a second wireless V2V network; and
provide, to the second wireless V2V network, a third status of the vehicle together with the second identifier, wherein the third status of the vehicle relates to the state of the vehicle to anonymously coordinate with other vehicles on the second wireless V2V network.

16. The computer program product of claim 15, wherein the second key is based on a fourth status of the vehicle.

17. The computer program product of claim 14, wherein:
the first triggering event of the vehicle is the vehicle turning on at a first time;
the first status includes the first time;
the first key includes time data of the first time;
the second status includes global positioning system data of the vehicle and velocity data of the vehicle.

18. The computer program product of claim 17, wherein the static device tag for the vehicle is a vehicle identification number for the vehicle.

19. The computer program product of claim 14, wherein:
the first triggering event is the vehicle entering a predefined range of a second V2V device; and
the static device tag is a vehicle license plate number.

20. The computer program product of claim 14, wherein the static device tag is exclusive to the vehicle.

* * * * *